Aug. 12, 1941. W. E. MARKS 2,252,191

SMALL ANIMAL INCUBATOR

Filed Feb. 2, 1940

Wade E. Marks
INVENTOR,
BY W. B. Harpman
ATTORNEY.

Patented Aug. 12, 1941

2,252,191

UNITED STATES PATENT OFFICE 2,252,191

SMALL ANIMAL INCUBATOR

Wade E. Marks, Youngstown, Ohio

Application February 2, 1940, Serial No. 316,951

1 Claim. (Cl. 119—15)

This invention relates to a small animal incubator.

The principal object of the invention is to provide a practical and efficient means for keeping small animals such as dogs and cats sufficiently warm during their first several months of life.

A further object of the invention is the provision of a small animal incubator the heating means of which may be easily adjusted as to the degree of warmth provided.

Specifically, the small animal incubator shown and described herein comprises a rectangular frame around the interior of which have been positioned a plurality of small electric light bulbs. A screen or suitable grid is positioned across the top of the rectangular frame and a pasteboard box is positioned thereon in which the small animals may be conveniently placed.

With the foregoing and other objects in view which will appear as the description proceeds, the invention resides in the combination and arrangement of parts and in the details of construction hereinafter described and claimed it being understood that changes in the precise embodiment of the invention herein disclosed, can be made within the scope of what is claimed without departing from the spirit of the invention.

The invention is illustrated in the accompanying drawing, wherein.

Figure 1:
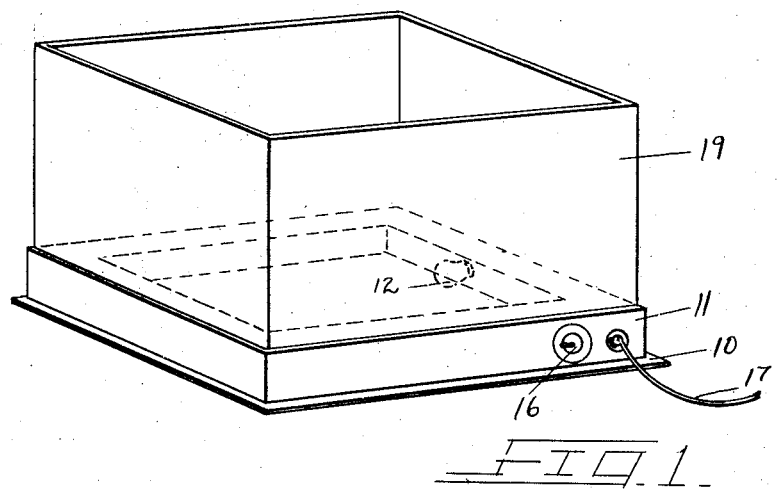
Figure 1 is a perspective view of the complete small animal incubator.

By referring to the drawing and Figure 1 in particular it will be seen that the small animal incubator comprises an asbestos mat 10 upon which is positioned a rectangular heating frame 11 formed of suitable material, preferably wood, and provided with a plurality of small electric light bulbs 12 around the interior sides thereof.

Figure 2:
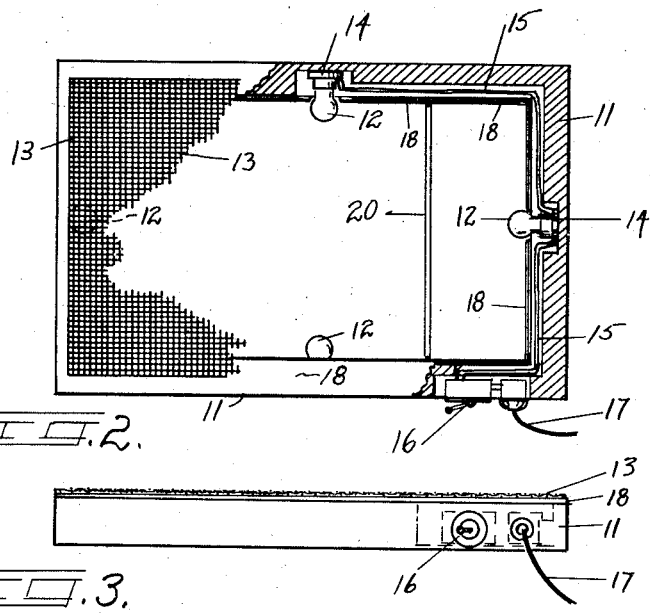
Figure 2 is a top plan view of the heating frame portion of the incubator with parts broken away.
Figure 3:
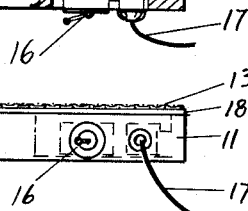
Figure 3 is a side elevation of the heating frame portion of the small animal incubator.

By referring to Figure 2 of the drawing it will be seen that the heating frame 11 has positioned across the top thereof a suitable grid or screen 13 which is shown broken away from the frame in Figure 2 in order that the interior arrangement of the heating means may be more clearly shown. Still referring to Figure 2 it will be seen that the heating means comprises a plurality of electric light bulb receiving sockets 14 suitably connected together by wiring 15. The bulbs 12 are controlled by means of a conveniently located electric switch 16 and a suitable electric extension cord 17 is connected into the circuit, as a current supply means.

Still referring to Figure 2 of the drawing it will be seen that the screen or grid 13 is held in position on the heating frame by any convenient means such as tacking the same thereto or the use of a clamping strip imbedded in the frame itself. Positioned between the screen 13 and the heating frame 11 and suitably covering the entire interior area of the heating frame 11 there is an asbestos lining 18 which may be affixed thereto by any suitable means. This asbestos lining 18 in connection with the asbestos pad 10 insures complete safety in using the small animal incubator.

Again referring to Figure 1 of the drawing it will be seen that in order to provide a convenient and readily replaceable receptacle in which the small animals may be positioned, a pasteboard box 19 is positioned upon the heating frame, the screen or grid 13 thereof serving to insure its adequate support across its entire bottom. The small animals are placed in the pasteboard box 19 and it is obvious that this pasteboard box may be readily discarded when necessary and replaced with a new box without affecting the operation of the heating frame in any way. The box 19 would preferably be of approximately the same size as the heating frame employed although in the event that a smaller box would be preferred, a partition such as indicated by the numerals 20 in Figure 2 might be positioned across one end of the heating frame so as to effectively reduce the area thereof, it being necessary to remove one of the bulbs 12 as its heat would otherwise be wasted. It is obvious that the heat supplied in this incubator may be readily varied by the use of varying numbers of the bulbs or by varying the size of the bulbs. It has been determined that ten watt bulbs are adequate for average use and that four such bulbs in a heating frame of average size will maintain a temperature of approximately 100° within the pasteboard box, which temperature is entirely adequate for the protection of the small animals placed therein.

What I claim is:

An incubator for small animals comprising in combination a heating frame wherein a plurality of electric light bulbs generate sufficient heat and a cardboard box adapted to be positioned upon the said frame so as to receive the said small animals, means formed across the top of the said frame adapted to suitably support the entire bottom of the said cardboard box, together with an asbestos lining of the said frame and a removable partition adapted to partition off one end of the said frame from the remainder thereof.

WADE E. MARKS.